United States Patent Office 3,684,520
Patented Aug. 15, 1972

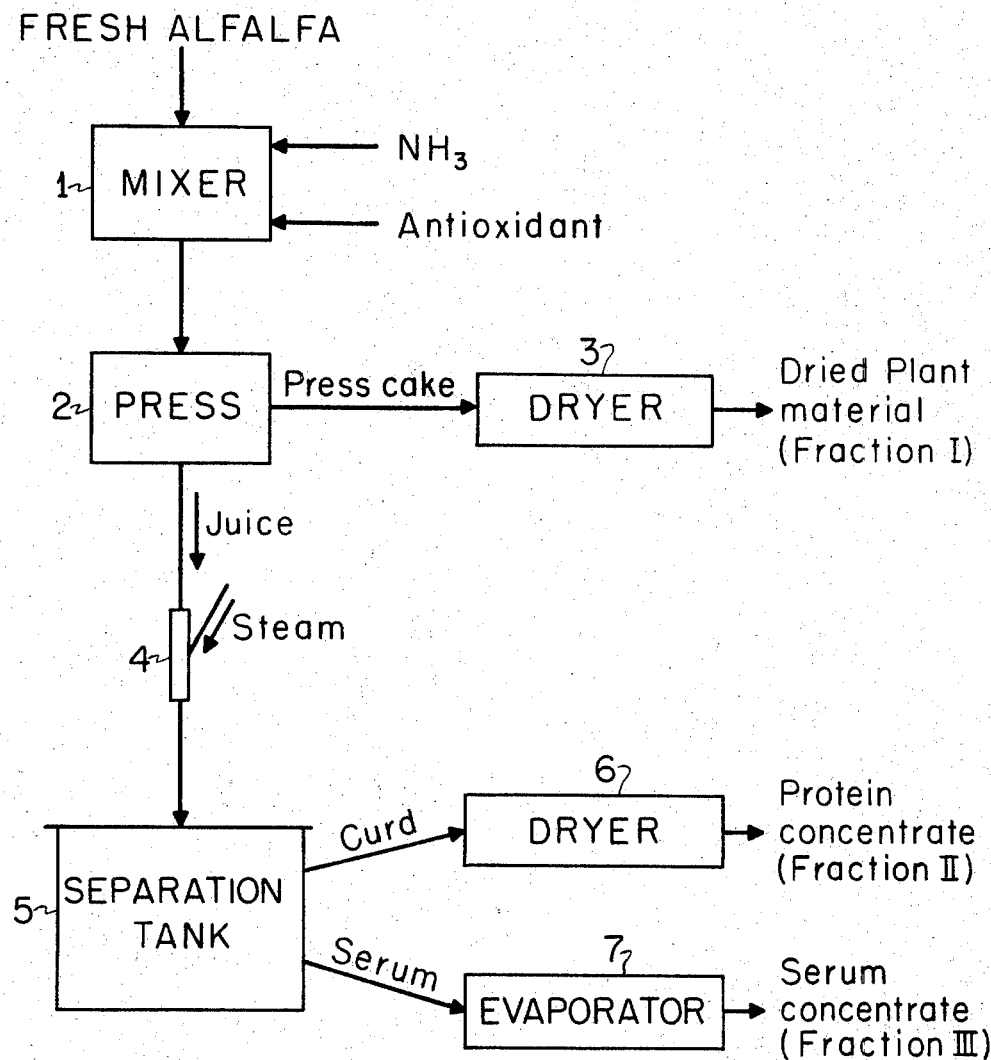

3,684,520
FRACTIONATION OF LEAFY GREEN CROPS
Emanuel M. Bickoff, Berkeley, Roland R. Spencer, Pleasant Hill, and George O. Kohler, El Cerrito, Calif., assignors to the United States of America as represented by the Secretary of Agriculture
Filed Dec. 9, 1969, Ser. No. 883,544
Int. Cl. A23k 1/14, 3/02
U.S. Cl. 99—8                                      7 Claims

ABSTRACT OF THE DISCLOSURE

Processes for fractionating alfalfa and other leafy green crops to provide products useful in animal feeding. Example: Fresh green alfalfa—preferably pretreated with ammonia and an antioxidant such as ethoxyquin—is pressed, yielding a press cake and a juice. The former is dried; the latter is further treated as by heating with incorporation of a fixed gas, yielding a curd rich in proteins and carotenoids.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel processes for fractionating alfalfa and other leafy green crops whereby to obtain products highly useful for animal feeding and for other purposes. Further objects of the invention will be evident from the following description wherein parts and percentages are by weight unless otherwise specified.

The annexed drawing is a flow sheet illustrating the practice of the invention.

In the following description, emphasis is directed to the treatment of alfalfa which constitutes the major forage crop in the United States. Reference to this particular material is, however, only by way of illustration, not limitation. A similar situation is encountered with other green vegetable materials, and in its broad ambit the invention is applicable to leafy green crops in general, for example, grasses, lespedeza, clover, alfalfa, and similar conventional forages, and other leafy green vegetable materials such as lettuce, cabbage, kale, pea or bean vines, celery tops, beat tops, and the like, grown deliberately for animal feeding or available as wastes or by-products from food packing or processing establishments.

It is well known that alfalfa is a rich source of nutrients, including proteins and carotene (pro-vitamin A). In current practice, alfalfa is harvested, dehydrated in a rotary kiln, and then ground and pelleted. A small proportion of an antioxidant such as ethoxyquin may be incorporated with the dried product to preserve oxidation-labile components such as carotenoids during storage of the product. This dehydrated alfalfa product (commonly referred to as "dehy" in the trade) is produced in large tonnages for both domestic use and export to foreign countries, both Asiatic and European. Although dehy is valuable for animal feeding, it is often desired to provide—particularly for poultry feeding—a high-energy ration, that is, one which is higher in protein and lower in fiber than standard dehy. Also desired for poultry feeding are rations which are rich in xanthophyll—needed to provide chickens with highly-pigmented (bright golden) skin, which most consumers prefer over chickens with pale skin. Also, in maintaining hens for egg production, such xanthophyll-rich rations are advantageous to provide eggs with yolks of a deep yellow color. Another item is that alfalfa is rich in unidentified factors which beneficially affect growth, health, and reproduction of poultry, swine, and ruminant animals. There is a demand for a concentrated form of these factors which can be used to enrich animal rations deficient therein.

Primary objects of the invention are the provision of novel processes which furnish such specialized products concomitantly with dried forage plant material not significantly different in its content of protein and carotenoids from standard dehy. In sum, the invention provides the means to fractionate alfalfa or other green leafy crops into a series of products, each highly useful and in demand in industry. An especially significant advantage of the invention is that our novel technique for preparing the aforesaid dried plant material involves substantial economies over conventional dehy production, with the end result that the specialized products are received largely as a bonus in the overall operation.

The manner in which these objects are attained is next described, having reference to the drawing, and applied to alfalfa by way of example.

The starting material for the fractionation is fresh green alfalfa, preferably in chopped form. In usual farming practice, alfalfa is chopped as it is harvested; this conventional chopped green plant material is the starting material of choice for our process.

The fresh green alfalfa is fed into mixer 1 which may take the form, for example, of a chamber provided with a mixing screw, or a rotary drum. Mixer 1 is advantageously used for incorporating desired additives into the alfalfa mass, the preferred additives being ammonia and an antioxidant. The influence of these additives is discussed in a later portion of the description.

After the mixing step the green alfalfa material is dejuiced by passing it through press 2 which may take the form, for example, of a set of conventional sugarcane rolls. Other devices which may be used for the de-juicing are screw presses or expellers. In this de-juicing operation, there is produced a juice fraction and a press cake of fibrous material. Generally this press cake will have a moisture content of about 65–75%. The respective amounts of juice and press cake will vary depending primarily on the moisture content of the starting material. In typical operations, 100 lbs. of green alfalfa will yield about 40 to 50 lbs. of juice and the remainder press cake.

The press cake is conveyed through dryer 3 which may take the form of a rotary kiln conventionally used in alfalfa drying operations, yielding a dried product herein designated as Fraction I.

Hereinabove it has been mentioned that this dried plant material (Fraction I) is not significantly different in its content of protein and carotenoids from standard dehy. This important facet of the invention is demonstrated by the following experiment.

ILLUSTRATION I

A sample of green alfalfa (80% moisture) was divided into two 500-lb. portions. One portion was dehydrated directly to product a standard dehy; the other was pressed and the press cake (295 lbs., 72.5% moisture) was dried. Analysis of the products provided the following data:

| Product | Yield | | Moisture, percent | Protein,[1] percent | Carotene,[1] mg./lb. | Xanthophyll,[1] mg./lb. |
|---|---|---|---|---|---|---|
| | Lbs. | Percent | | | | |
| Standard dehy (conventional) | 107.5 | 21.5 | 7 | 20 | 133 | 202 |
| Fraction I (in accordance with invention) | 87.3 | 17.5 | 7 | 19.6 | 127 | 183 |

[1] Analyses reported on dry basis.

It is evident from the above figures that Fraction I is substantially unimpaired in its content of protein, carotene, and xanthophy, and was produced in a yield of 81% that of standard dehy. The loss in yield is, however, more than made up by a saving in evaporating cost. Taking into account that production of the dehy required evaporation of 3.65 tons of water for each ton of product formed, that production of Fraction I required evaporation of only 2.38 tons of water per ton of product, and assuming a standard evaporation (fuel) cost of $1.15 per ton of water evaporated, it may be readily calculated that production of Fraction I involves a saving of 1.15 (3.65−2.38) or $1.46 per ton of product. This calculation involves only fuel cost. If amortization costs are also taken into account—as they must in any industrial operation—it is estimated that the savings would amount to $3.16 per ton of product. It is also to be observed that these calculations do not take into account the value of the by-products which may be recovered from the press juice.

Another important advantage is that application of the process of the invention enables an operator to produce a larger amount of dehydrated product, using the same dehydration equipment. This comes about for two reasons: One is that the amount of water which must be evaporated per unit weight of product is decreased, since part of the original water is removed in the pressing operation. Another is that the volume of the material is decreased by pressing operation. As a result, application of the invention enables a 30 to 40% increase in throughput through the dehydrator with no increase in fuel requirements. For example, in applying our invention to a large-scale alfalfa operation handling some 300,000 tons of green alfalfa per year, we have determined that with a dehydrator which in conventional operation can produce at most 100 tons per day of dehy, one can produce 130 to 140 tons per day of dehydrated product of substantially equal nutritive value with no increase in fuel costs.

Returning now to the drawing, the juice issuing from press 2 is conveyed through heater 4 wherein it is heated in order to precipitate a curd of protein and carotenoids. This heating is preferably accomplished by direct contact with steam. To attain the desired precipitation effect, the juice is brought to a temperature of 60 to 100° C. Preferably, the juice is brought to a temperature no higher than about 85° C. in order to minimize decomposition of xanthophyll and other valuable components of the juice. In a preferred embodiment of the heating step, a fixed gas such as air or, more preferably, a non-oxidizing gas such as dichlorodifluoromethane, nitrogen, helium, methane, or the like, is introduced into the juice. The gas may be readily added to the stream of steam which contacts the juice. Addition of the gas has the desirable effect that the curd assumes an especially low density whereby, in a subsequent separation step, it can be readily separated from the residual juice. In other words, the added gas decreases the density of the curd so that when the heated material is discharged into a tank, the curd quickly and completely rises and floats on top of the denser phase of residual liquid. In the event that air or other gas is not incorporated during the heating step as hereinabove disclosed, it may be incorporated into the juice before or after application of the heating step. For example, the hot juice may be passed through a conventional aerator wherein air, nitrogen or other gas is whipped into the hot liquid.

The hot juice from heater 4 is directed into tank 5 for separation of the curd and the residual liquid or serum. In tank 5 the curd rises to the top, such action being enhanced by addition of a gas into the juice as previously mentioned. The curd is removed from tank 5 and directed to dryer 6 which may take the form of a conventional double-drum dryer or a rotary kiln dryer, or fluidized bed dryer. The dried product herein referred to as Fraction II is a protein concentrate, rich in carotenoids. In typical runs Fraction II will contain (on dry basis) over 50% protein, at most 1 or 2% fiber, 225 to 275 mg./lb. of carotene, and 400 to 500 mg./lb. of xanthophyll.

The serum removed from the lower part of tank 5 is concentrated in a conventional flash evaporator 7 to produce a syrup containing about 50 to 70% solids. This syrup, herein termed Fraction III, is a rich source of the water-soluble nutrients derived from the original alfalfa. It is particularly valuable for its content of UGF (unidentified growth factors which beneficially affect growth, health, and reproduction of poultry, swine, and ruminants). It also contains amino acid, sugar, mineral salts, and water-soluble vitamins.

It is to be understood that the separation of the curd by flotation as described above, although preferred, is but one technique for accomplishing the desired end. An alternative procedure is to de-aerate the mixture of curd and serum by standing, preferably with mild agitation to release entrapped air from the curd. Thereby the curd sings to the bottom, and the curd and serum can then be separated by applying filtration, decantation or centrifugation. The separation is also conducted in this manner in the event that no air or other gas is introduced into the material before, during, or after heating.

Hereinabove it has been noted that in a preferred embodiment of the invention, ammonia is incorporated with the fresh alfalfa prior to pressing. By this technique several distinct advantages are secured:

One advantage is that the curd (formed on heating the juice) is more readily and completely separable from residual juice. In the absence of added NH$_3$, the precipitated material is a slimy and gelatinous mass which is difficult to separate from the juice; it tends to remain mixed with the juice even if air or other gas is added. Where, however, ammoniation is used, the curd is firm and separates readily from the juice. In contrast with the non-ammoniated curd, it undergoes syneresis soon after it is formed so that much of the occluded juice drains out of it rather than being retained in its structure.

Another item is that the added ammonia preserves the chlorophyll content of the curd. Accordingly, the dried curd material (Fraction II) has an attractive deep green color and may be used—in addition to its primary use as a feed material—as a source from which to extract chlorophyll for pharmaceutical applications or for incorporation in soaps. In the absence of added ammonia a destruction or decomposition of chlorophyll occurs so that the dried curd material has an unattractive olive-brown color.

Another item to be considered is that when the alfalfa is pressed there occurs a disruption of the natural organization of the plant structure. Thereby enzymes and enzyme substrates normally isolated from one another by structural organization are put into mutual contact. One of the results of such contact is the destruction of carotenoids such as carotene and xanthophyll. However, by addition of ammonia, enzymic action is reduced with the result that loss of carotenoids is minimized.

To secure the benefits outline above, enough ammonia is added to give the alfalfa material a pH of at least 7, preferably about 8.0–8.5. (The natural pH of alfalfa is 5.5 to 6.5.) In the preferred embodiment of the invention, the ammonia is added to the fresh alfalfa prior to pressing. However, the ammonia may be added to the juice and press cake fractions after pressing. This technique is less efficacious than where ammonia is added before pressing, in which case its influence will be realized at the moment when the plant structure is disrupted in the pressing step.

Ammoniation of the alfalfa material is most easily effected by adding the anhydrous gas from a commercial tank. Although addition of ammonia in the gas form offers the most convenient way, one may add it in the form of aqueous solutions. Thus for the purposes of the invention, aqua ammonia may be considered the equivalent of gaseous ammonia.

In a foregoing portion of this description it has been noted that in a preferred embodiment of the invention, an antioxidant is incorporated with the fresh alfalfa prior to pressing. This has the useful result of stabilizing the vitamins, carotene, xanthophyll, and other oxidation-labile components during the processing steps and during storage of the final products. For the purpose, one may use any of the antioxidants which have the ability to preserve carotenoids in alfalfa and other forage materials. Particularly preferred is the compound 6-ethoxy-2,2,4-trimethyl-1,2-dihydroquinoline, commonly known as ethoxyquin. Other related quinoline derivatives which may be used are disclosed by Thompson in Patent 2,562,970. The antioxidant is conveniently applied as an emulsion, formed by emulsifying it in water with a small proportion of a conventional emulsifier such as polyoxyethylene sorbitan monopalmitate. Since the quinolines are nitrogen bases, they form salts with acids, for example, sulphuric acid, hydrochloric acid, phosphoric acid, etc. These salts are especially useful since they are water-soluble and can be applied to the alfalfa material in the form of an aqueous solution. In general, enough of antioxidant is applied to provide a concentration thereof of about 0.015% to about 0.5% based on the dry weight of the alfalfa. For best results the antioxidant is applied to the alfalfa before pressing so that it will be present at the instant when the structure of the plant material is disrupted in the pressing step. In an alternative, less preferred, embodiment the antioxidant is added to the juice and press cake fractions formed in the pressing operation. It may be noted that herein we do not claim novelty per se in the idea of adding antioxidants to the fresh alfalfa; this is the subject of the commonly-assigned application of Arvin L. Livingston and George O. Kohler, Ser. No. 728,334, filed May 10, 1968.

The following illustration demonstrates the effect of added ammonia and antioxidant in preserving valuable provitamin constituents of alfalfa.

ILLUSTRATION II

A quantity of fresh alfalfa was divided into several lots, each being treated as follows:

Lot 1: The fresh alfalfa without any treatment was crushed to disrupt the plant structure, and the crushed material was analyzed.

Lot 2: Sprayed with an aqueous dispersion of ethoxyquin to provide a concentration thereof of 0.15% based on dry weight of the alfalfa. The alfalfa was then crushed to disrupt the plant structure and the product analyzed.

Lot 3: Sprayed with aqua ammonia to give the alfalfa a pH of 8.0 to 8.5. The ammoniated alfalfa was then crushed and the product analyzed.

Lot 4: In this case both ethoxyquin and ammonia were applied in the same amounts as above, the material crushed and analyzed.

The results are tabulated below.

| Lot No. | Additive | Proportion of original amount retained in crushed product, percent | |
|---|---|---|---|
| | | Carotene | Xanthophyll |
| 1 | None | 65 | 63 |
| 2 | Ethoxyquin | 75 | 78 |
| 3 | Ammonia | 81 | 88 |
| 4 | Ethoxyquin and ammonia | 85 | 89 |

ILLUSTRATION III

The invention is further demonstrated by the following illustrative example:

Fresh green alfalfa in chopped form was passed through a drum equipped with a spiral mixing blade. Ammonia gas from a tank was metered into the drum at a rate of about 2 to 3 lbs. per ton of alfalfa, sufficient to give the treated alfalfa a pH of 8.0 to 8.5.

The ammoniated alfalfa was then passed through a set of sugarcane rolls to produce (per 100 lbs. of alfalfa) 40 lbs. of juice and 60 lbs. of press cake. The press cake was dried in a rotary kiln conventionally used in drying alfalfa. The dried cake was designated as Fraction I.

The juice from the pressing operation was pumped through a steam injector heater wherein it was brought to about 85° C. by direct contact with steam. The hot material was directed into a tank and the upper layer, the curd, was removed and dried on a double-drum dryer at a drum temperature of about 300–320° F. The dark green dried product was designated Fraction II.

The serum remaining after withdrawal of the curd was removed from the tank and flash evaporated to a syrup containing 50% solids, this product being designated Fraction III.

The starting material and the products were analyzed, the results being tabulated below.

For comparison purposes, a batch of the same green alfalfa was dried in conventional manner to provide a standard dehy. This product was also analyzed and the data is included in the following table:

| Product | Amount, lbs. | Moisture, percent | Fiber,[1] percent | Fat,[1] percent | Protein[1] | | Carotene[1] | | Xanthophyll[1] | |
|---|---|---|---|---|---|---|---|---|---|---|
| | | | | | Proportion, percent | Amount, lbs. | Proportion, mg./lb. | Amount, mg. | Proportion, mg./lb. | Amount, mg |
| Green alfalfa (starting material) | 500 | 80 | 23 | 4.0 | 21.5 | 21.5 | 155 | 15,500 | 354 | 35,400 |
| Fraction I (dried press cake) | 87.3 | 7 | 25 | 3.6 | 19.6 | 15.9 | 127 | 10,287 | 183 | 14,823 |
| Fraction II (dried curd) | 4.45 | 10 | 1.6 | 6.7 | 50 | 2.0 | 250 | 1,000 | 450 | 1,800 |
| Fraction III (conc. serum) | 29.6 | 50 | 0.6 | 0.5 | 7.4 | 1.1 | None | | None | |
| Conventional dehy | 107.5 | 7 | 23 | 4.0 | 20.0 | 20.0 | 133 | 13,300 | 202 | 20,200 |

[1] Proportions and amounts on dry basis.

Having thus described the invention, what is claimed is:

1. A process for fractionating green leafy vegetable material, which comprises—
   (a) pressing green leafy vegetable material to form a juice and a press cake,
   (b) heating the juice to a temperature of about 60 to 100° C. to precipitate a curd rich in protein and carotenoids, and incorporating a non-oxidizing gas into the juice to decrease the density of the curd, whereby to facilitate its separation from the residual juice,
   (c) and separating the resulting curd from the residual juice.

2. The process of claim 1 wherein the green leafy vegetable material is fresh green alfalfa.

3. The process of claim 1 wherein, in Step b, the juice is heated by direct contact with steam and with concomitant incorporation of the fixed gas.

4. The process of claim 1 wherein the vegetable material, prior to pressing, is treated with ammonia in an amount sufficient to provide a pH of 8.0 to 8.5.

5. The process of claim 1 wherein, prior to pressing, a carotenoid-stabilizing antioxidant is incorporated with the vegetable material.

6. The process of claim 1 wherein, prior to pressing, ethoxyquin is incorporated with the vegetable material.

7. The process of claim 1 wherein the vegetable material is alfalfa and wherein said alfalfa, prior to pressing, is treated with ammonia in an amount to provide a pH of about 8.0 to 8.5, and with ethoxyquin in a concentration of about 0.01% to 0.5% based on the dry weight of alfalfa.

References Cited

UNITED STATES PATENTS

| | | | |
|---|---|---|---|
| 2,552,343 | 5/1951 | Peebles et al. | 99—8 |
| 2,562,970 | 8/1951 | Thompson | 99—8 |
| 2,190,176 | 2/1940 | Smith | 99—2 |
| 2,579,609 | 12/1951 | Peebles et al. | 99—2 |
| 2,607,688 | 8/1952 | Peebles et al. | 99—8 |
| 2,559,459 | 7/1951 | Peebles et al. | 99—8 |
| 2,600,903 | 6/1952 | Miller | 99—2 |
| 3,093,488 | 6/1963 | Graham et al. | 99—2 |
| 3,313,795 | 4/1967 | Rubin | 99—14 |

NORMAN YUDKOFF, Primary Examiner

C. P. RIBANDO, Assistant Examiner

U.S. Cl. X.R.

99—2 R, 17